US011620156B2

(12) United States Patent
Tsirkin et al.

(10) Patent No.: US 11,620,156 B2
(45) Date of Patent: Apr. 4, 2023

(54) LIVE MIGRATION WITH GUARANTEED MAXIMUM MIGRATION DOWNTIMES

(71) Applicant: Red Hat, Inc., Raleigh, NC (US)

(72) Inventors: Michael Tsirkin, Westford, MA (US); Amnon Ilan, Katzir (IL)

(73) Assignee: Red Hat, Inc., Raleigh, NC (US)

( * ) Notice: Subject to any disclaimer, the term of this patent is extended or adjusted under 35 U.S.C. 154(b) by 306 days.

(21) Appl. No.: 17/112,002

(22) Filed: Dec. 4, 2020

(65) Prior Publication Data

US 2022/0179684 A1 Jun. 9, 2022

(51) Int. Cl.
G06F 9/455 (2018.01)
G06F 9/48 (2006.01)
G06F 11/07 (2006.01)

(52) U.S. Cl.
CPC ........ G06F 9/4856 (2013.01); G06F 9/45558 (2013.01); G06F 11/0757 (2013.01); G06F 11/0772 (2013.01); *G06F 2009/4557* (2013.01); *G06F 2009/45595* (2013.01)

(58) Field of Classification Search
CPC .................................................. G06F 9/4856
USPC ............................................................ 718/1
See application file for complete search history.

(56) References Cited

U.S. PATENT DOCUMENTS

| 10,552,199 B2 * | 2/2020 | Franciosi | G06F 9/45558 |
| 10,552,209 B2 * | 2/2020 | Franciosi | G06F 3/0647 |
| 2004/0255296 A1 * | 12/2004 | Schmidt | G06F 9/4887 |
| | | | 718/100 |
| 2011/0264788 A1 * | 10/2011 | Costa | G06F 9/5077 |
| | | | 718/1 |
| 2015/0160972 A1 * | 6/2015 | Yu | G06F 9/4856 |
| | | | 718/1 |
| 2015/0193250 A1 * | 7/2015 | Ito | G06F 9/4856 |
| | | | 718/1 |
| 2015/0378759 A1 * | 12/2015 | Pershin | G06F 9/45558 |
| | | | 718/1 |

(Continued)

FOREIGN PATENT DOCUMENTS

CN 110737507 1/2020

OTHER PUBLICATIONS

Dependable Estimation of Downtime for Virtual Machine Live Migration; Salfner et al.; International Journal on Advances in Systems and Measurements, vol. 5, No. 1 and 2; 2012; retrieved Sep. 1, 2020 (19 pages).

*Primary Examiner* — Mehran Kamran
(74) *Attorney, Agent, or Firm* — K&L Gates LLP (57) ABSTRACT

Methods and systems for improved live migration of computing processes with guaranteed maximum downtime are provided. In a first embodiment, a method is provided that includes migrating a computing process between two virtual machines according to a first migration phase. The computing process may continue executing during the first migration phase. A second migration phase may begin, in which execution of the computing process may stop. It may be detected that a duration of the second migration phase exceeds a predetermined period of time, and the second migration phase may be halted such that the computing process continues executing on an original virtual machine. The predetermined period of time can be determined based on a downtime for resuming execution of the computing process and a predicted worst case start time for the computing process.

20 Claims, 7 Drawing Sheets

(56) References Cited

U.S. PATENT DOCUMENTS

| | | | |
|---|---|---|---|
| 2018/0157541 A1* | 6/2018 | Tsuchimoto | G06F 9/5083 |
| 2018/0213036 A1* | 7/2018 | Vasetsky | H04L 41/082 |
| 2018/0247055 A1* | 8/2018 | Curtis | G06F 21/554 |
| 2019/0079790 A1* | 3/2019 | Tagashira | G06F 9/45558 |
| 2019/0229978 A1* | 7/2019 | Rajvaidya | H04L 41/069 |
| 2019/0265995 A1* | 8/2019 | Franciosi | G06F 9/45558 |
| 2019/0286475 A1* | 9/2019 | Mani | G06F 9/45558 |
| 2019/0286476 A1* | 9/2019 | Franciosi | G06F 3/067 |
| 2019/0294462 A1* | 9/2019 | Franciosi | G06F 9/45533 |
| 2020/0142753 A1* | 5/2020 | Harwood | G06F 9/52 |
| 2020/0382405 A1* | 12/2020 | Banerjee | H04L 45/121 |
| 2021/0026707 A1* | 1/2021 | Rosenberg | G06F 9/485 |
| 2021/0240522 A1* | 8/2021 | Ranjan | G06F 3/0647 |
| 2021/0303565 A1* | 9/2021 | Blackwood | H04L 41/064 |
| 2021/0342232 A1* | 11/2021 | Gopalan | G06F 11/1471 |
| 2022/0100547 A1* | 3/2022 | Yamamoto | G06F 3/0689 |
| 2022/0350708 A1* | 11/2022 | Vishwakarma | G06F 11/1448 |

* cited by examiner

LIVE MIGRATION WITH GUARANTEED MAXIMUM MIGRATION DOWNTIMES

BACKGROUND

Computing processes may execute in computing environments that share computing resources among multiple computing process. In such computing environments, the computing processes may need to be migrated between different virtual machines on the computing platform.

SUMMARY

The present disclosure presents new and innovative systems and method live migration of computing processes with guaranteed maximum downtime. In a first embodiment, a method is provided that includes migrating, according to a first migration phase, a computing process from a first virtual machine to a second virtual machine. The computing process may continue executing on the first virtual machine during the first migration phase. The method may further include beginning, upon completing the first migration phase, a second migration phase to migrate the computing process from the first virtual machine to the second virtual machine. Execution of the computing process may halt on the first virtual machine during the second migration phase. The method may also include detecting that a duration of the second migration phase exceeded a first predetermined period of time. The first predetermined period of time may be determined at least in part based on (i) a downtime for resuming execution of the computing process and (ii) a predicted worst case start time for the computing process on the second virtual machine. The method may further include halting the second migration phase such that the computing process resumes executing on the first virtual machine.

In a second embodiment, a system is provided that includes a processor and a memory. The memory stores instructions which, when executed by the processor, cause the processor to determine a migration time limit for a migration phase performed to migrate a computing process from a first virtual machine to a second virtual machine by subtracting a predicted worst case start time for the computing process from a downtime associated with the computing process. The instructions may further cause the processor to migrate the computing process according to the migration phase. Execution of the computing process may halt on the first virtual machine during the migration phase. The instructions may also cause the processor to detect that a duration of the migration phase has exceeded the migration time limit, interrupt the migration phase, and resume execution of the computing process on the first virtual machine.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Migrating computing processes may require execution of the computing processes to be halted. For example, executing a computing process may change the contents of memory associated with the computing process. In order to ensure execution is properly transferred between virtual machines, execution of the computing process may need to be stopped so that at least a portion of the computing processes may be transferred. However, computing processes may require a particular uptime and therefore execution of the computing process may only be paused for a certain amount of time to comply with these requirements. Typical migration systems may monitor a total migration time for the migration process, which can include multiple phases, including a phase where the computing process is able to still execute within one of the virtual machines and a phase where execution of the computing process is halted. However, such systems may not accurately track or limit the downtime. Furthermore, the systems may still allow for migrations that exceed downtime requirements due to delays in initializing execution of the computing process on the new virtual machine.

One solution to this problem is to determine a migration time limit for a particular migration phase (e.g., a stop and copy phase) in which execution of computing process being migrated is halted. In particular, the migration time limit may be calculated to account for a predicted start time of the computing process, such as a predicted worst case start time. Upon detecting that a duration of the migration phase exceeds the migration time limit, a computing environment (e.g., a Red Hat® Virtualization environment) performing or orchestrating the migration may halt the migration and return execution to an original virtual machine for the computing process. However, if the migration time limit is not exceeded, the migration may proceed as normal. In certain instances, when the migration is halted, a different phase of the migration (e.g., a warm-up phase) may continue such that a future, repeated attempt at migrating the computing process may be completed faster and thereby comply with the migration time limit. Halting the migration when a duration of the particular migration phase (e.g., the stop and copy phase) exceeds the migration time limit enforces a guaranteed time limit by forcing the computing process to resume. Furthermore, by incorporating the predicted start time, the migration time limit can ensure that the computing process doesn't begin executing on the new virtual machine when the time required to begin executing the computing process is likely to cause the downtime of the computing process to exceed the guaranteed downtime.

Figure 1:
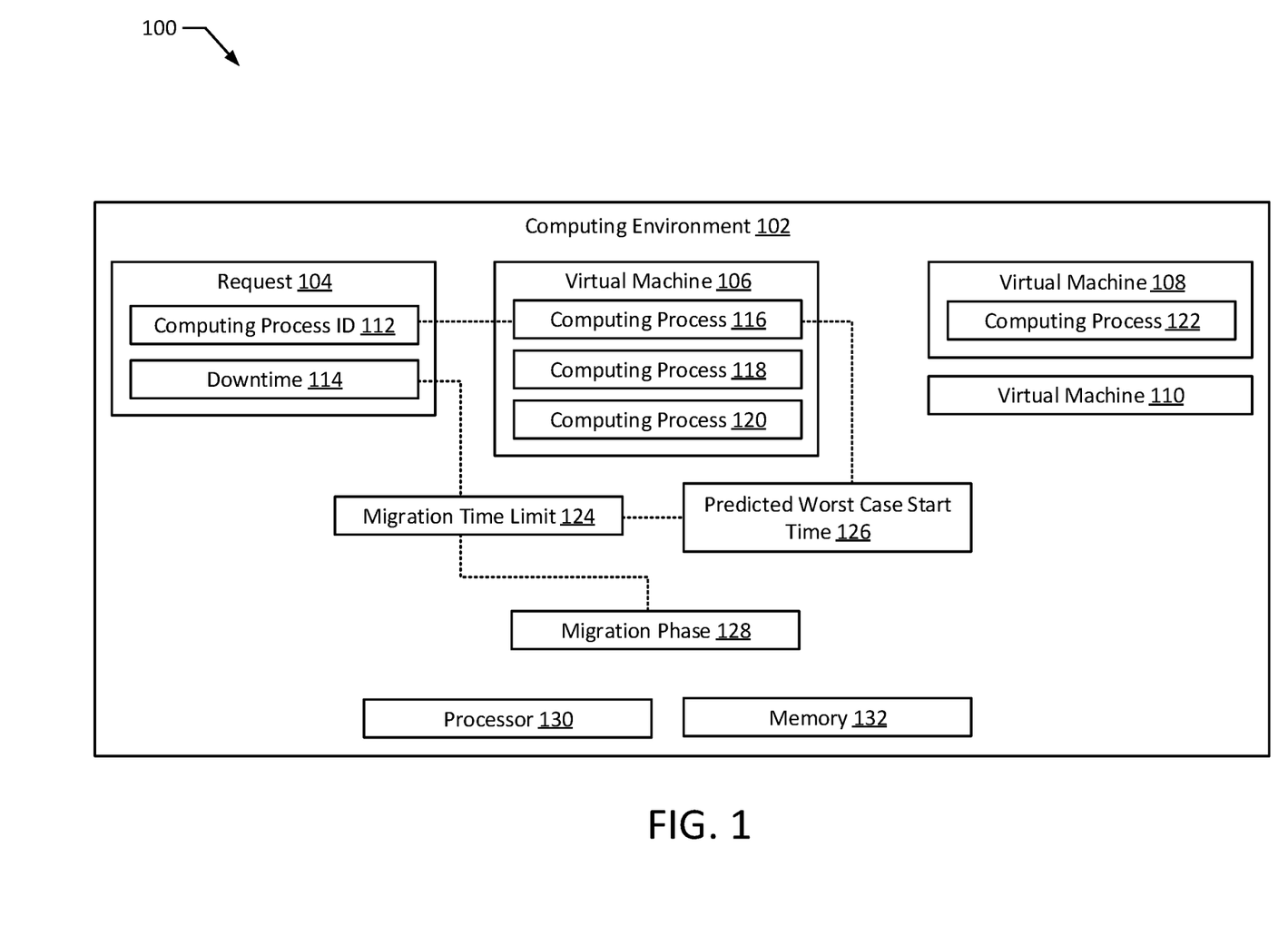
FIG. 1 illustrates a system for live migrating computing processes according to an exemplary embodiment of the present disclosure.

FIG. 1 illustrates a system 100 for live migrating computing processes according to an exemplary embodiment of the present disclosure. In particular, the system 100 may be configured to migrate computing processes within a cloud computing environment with minimal interruption to execution of the computing processes. In particular, the computing processes may be migrated with guaranteed maximum downtimes.

The system 100 includes a computing environment 102. The computing environment 102 may be a cloud computing environment, virtual computing environment, or other distributed computing environment. In particular, the computing environment 102 may be implemented as one or more computing devices distributed in one or more locations. In one particular embodiment, the computing environment 102 may be a distributed cloud computing environment executing on multiple computing devices in more than one locations.

The computing environment 102 includes a request 104, virtual machines 106, 108, 110, a migration time limit 124, a predicted worst case start time 126, and a migration phase 128. The virtual machines 106, 108, 110 may be configured to execute various computing processes 116, 118, 120, 122. The computing processes 116, 118, 120, 122 may execute using one or more computing resources made available by the virtual machines 106, 108, 110. For example, the virtual machines 106, 108, 110 may be implemented as virtual machines executing in a Red Hat® OpenShift Virtualization environment.

In certain instances, computing processes 116, 118, 120, 122 executing on the virtual machines 106, 108, 110 may need to be migrated to another virtual machine for continued execution. For example, computing processes 116, 118, 120, 122 may be migrated in response to constrained computing resources on one of the virtual machines 106, 108, 110. As another example, computing processes 116, 118, 120, 122 may be migrated in response to specific requests received from users (e.g., cloud computing users, network administrators, and the like). As a still further example, computing processes 116, 118, 120, 122 may be migrated to execute on a virtual machine implemented by a computing device located closer to an end user of the computing process 116, 118, 120, 122. In one specific example, the computing process 116 may be migrated to a new virtual machine 110 that is not currently executing any computing processes (e.g., to free up computing resources of the virtual machine 106).

In any of the above examples, the computing environment 102 may receive a request 104 to migrate the computing process 116. The request 104 may include a computing process identifier 112 and a downtime 114. The computing process identifier 112 may include a unique identifier of a computing process 116 to be migrated. For example, the computing process identifier 112 may include a numeric identifier of the computing process 116 (e.g., a process number, service number), an alphanumeric identifier of the computing process 116 (e.g., a service name, virtual machine name), or any other identifier of the computing process 116. The downtime 114 may identify a maximum downtime for the computing process 116, such as a maximum time for which execution of the computing process 116 can be halted or paused during migration of the computing process 116 (e.g., 1 ms, 10 ms, 100 ms). The downtime 114 may be specified by a user submitting the request 104. Additionally or alternatively, the downtime 114 may be previously-stored (e.g., in metadata associated with the computing process 116). In still further implementations, the downtime 114 may be determined based on a time of day and/or available computing resources for the virtual machine 110 to which the computing process 116 is migrated.

In response to the request 104, the computing environment 102 may begin migrating the computing process 116. To migrate the computing process 116, the computing environment 102 may follow a multi-stage live migration process. For example, the computing environment 102 may begin with a first migration phase in which all or part of the contents of the memory (e.g., of the virtual machine 106) associated with the computing process 116 are copied to the new virtual machine 110. During the first migration phase, execution of the computing process 116 may continue within the virtual machine 106. The migration may then proceed to a second migration phase in which execution of the computing process 116 is halted and additional contents of the memory are copied. For example, over the course of the first migration phase, the contents of the memory may change, and the changed memory contents (e.g., "dirty" memory pages) may be copied during the second migration phase. In certain implementations, the first migration phase may be a warm-up migration phase of a live migration process and the second migration phase may be a stop and copy phase of a live migration process.

During migration, the computing environment 102 may determine a migration time limit 124 for at least one migration phase 128 of the migration. For example, the migration time limit 124 may be determined for a second phase of the migration of the computing process 116, such as a stop and copy phase, in which execution of the computing process 116 is halted. In certain instances, the migration time limit 124 may be calculated based on a predicted worst case start time 126 of the computing process 116 and the downtime 114. For example, the migration time limit 124 may be calculated by subtracting the predicted worst case start time 126 from the downtime 114. The predicted worst case start time 126 may be calculated based on start times for previous executions of the computing process 116. For example, the predicted worst case start time 126 may be calculated as start times (e.g., times from the end of a stop and copy phase until the computing process begins execution) for previous migrations of the computing process 116. In certain implementations, the predicted worst case start time 126 may be selected as a maximum start time (e.g., the longest start time), an average start time, and/or a weighted average start from among a predetermined number (e.g., 10, 100, 1000) of previous migrations for the computing process 116. The start times for previous migrations may be measured using event-based measured that record the duration of time required to start up the computing process 116 after migration. The previous migrations may include migrations within the same computing environment 102 and/or within different computing environments.

During the migration phase 128, the computing environment 102 may monitor iteration of the migration phase 128. If the computing environment 102 determines that iteration of the migration phase 128 exceeds the migration time limit 124, the computing environment 102 may halt the second migration phase and resume execution of the computing process 116 within the virtual machine 106.

The computing environment 102 includes a processor 130 and a memory 132, which may implement one or more operational features of the computing environment 102. For example, the processor 130 and/or the memory 132 may implement one or more of the virtual machines 106, 108, 110 (e.g., may be at least partially allocated to the virtual machines 106, 108, 110). In practice, the processor 130 and the memory 132 may be implemented by more than one processor and/or more than one memory. For example, in implementations where the computing environment 102 is implemented by more than one computing device (e.g., more than one server machine), the processor 130 and the memory 132 may be implemented by processors and/or memories associated with the multiple computing devices.

Figure 2A:
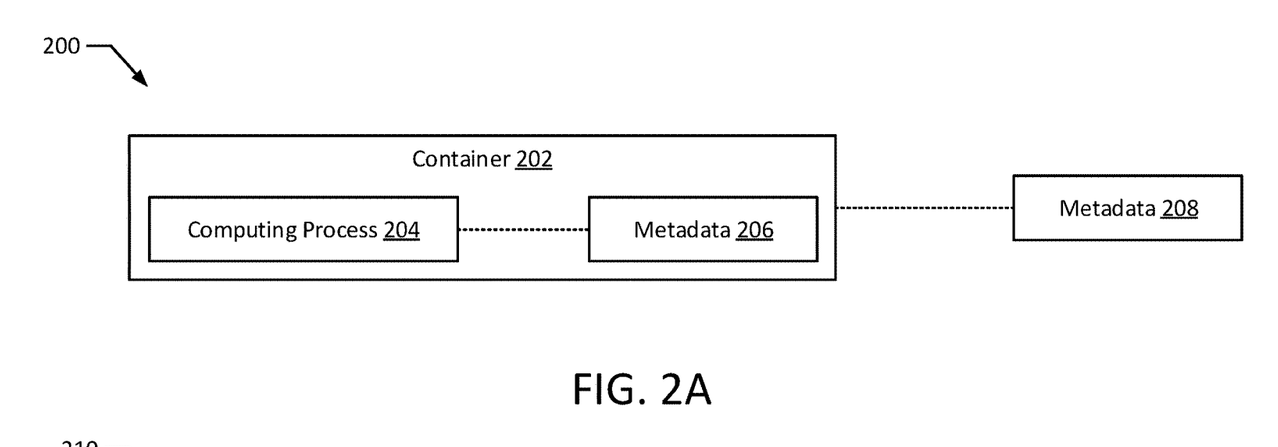
FIGS. 2A-2B illustrate metadata scenarios according to exemplary embodiments of the present disclosure.
Figure 2B:
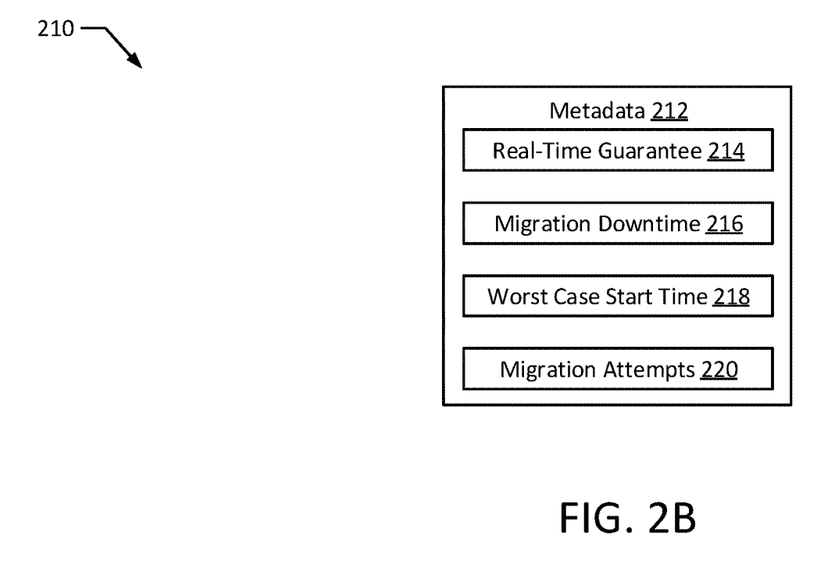

FIGS. 2A-2B illustrate metadata scenarios 200, 210 according to exemplary embodiments of the present disclosure. The metadata scenarios 200, 210 may indicate how metadata is stored in association with computing processes and/or other aspects of the computing environment 102. As will be further explained below, metadata stored in association with a computing process may be used to determine a migration time limit 124 and/or other time limits for the live migration process.

In the metadata scenario 200, a computing process 204 is executing within a container 202. The container may be implemented as a container within a virtual machine (e.g., a virtual machine 106, 108, 110). Additionally or alternatively, the container may execute within a cloud computing environment. In the metadata scenario 200, metadata 206 is associated with the computing process 204 and metadata 208 is associated with the container 202. The metadata 206, 208 may store information regarding the computing process 204 and/or the container 202. For example, the metadata 206, 208 may store operating requirements for the computing process 204 and/or the container 202. In certain implementations, metadata may be stored differently from the implementations discussed above. For example, in certain implementations, the computing process 204 may not execute within a container 202. In such instances, metadata 208 and the container 202 may be omitted.

In the metadata scenario 210, exemplary metadata 212 is depicted. The metadata 212 may be an exemplary implementation of metadata 206, 208 associated with the computing process 204 and/or a container 202. The metadata 212 includes a real-time guarantee 214, a migration downtime 216, a worst case start time 218, and migration attempts 220.

The real-time guarantee 214 may reflect a total uptime guaranteed for a computing process executing within a computing environment 102. For example, the real-time guarantee 214 may reflect a total uptime guaranteed on a rolling basis for a predetermined period of time (e.g., one second, 30 seconds, one minute). In one specific example, the real-time guarantee 214 may be specified as a 99% uptime over a preceding one second period. For such a real-time guarantee 214, a computing process may only be allowed downtime of 10 ms on a 1 second rolling basis.

The migration downtime 216 may specify a maximum downtime for a migration (e.g., a migration requested by a user). In certain implementations, the migration downtime 216 may specify a maximum duration of time that a computing process may be halted while migrating from one virtual machine to another virtual machine. As one specific example, the migration downtime 216 be specified as a maximum of 50 ms. In additional or alternative implementations, a migration downtime 216 may not be specified separately. In such instances, the real-time guarantee 214 may be used to determine the migration downtime 216. Additionally or alternatively, a migration downtime 216 may be specified in a request (e.g., as the downtime 114). In still further implementations, the migration downtime 216 may be determined based on a time of day (e.g., higher downtimes for nighttime migrations) and/or based on available computing resources for one of the virtual machines. In implementations where the migration downtime 216 is specified within metadata 212, a corresponding request 104 to migrate a computing process may not specify the downtime 114. Similarly, in implementations where the migration downtime 216 is separately received or determined, the metadata 212 may not be contained within the metadata 212.

The worst case start time 218 may store an indication of a predicted worst case start time for a corresponding computing process. For example, and as explained above, the worst case start time 218 may be determined based on the measurements for start times of previous migrations or initializations of the computing process. In particular, the worst case to time 218 may be measured and determined using techniques similar to those discussed above in connection with the predicted worst case start time 126. Once determined, the worst case start time 218 may be stored within the metadata 212 for future use in calculating the migration time limit 124.

The migration attempts 220 may store a number of attempted migrations for a corresponding computing process since the last time the corresponding computing process was successfully migrated. In particular, as explained above, attempted migrations may be halted if a second phase of the migration exceeds a migration time limit 124. In such instances, associated migration attempts 220 metadata may be incremented. This may be used to store and track a number of attempted migrations to determine when further action may be required, as discussed below.

Further implementations of the metadata 212 may include additional or alternative information from that discussed above. For example, metadata may further store information regarding a service name, associated user, associated domain, and the like. As another example, one or more of the real-time guarantee 214, the migration downtime 216, the worst case start time 218, and the migration attempts 220 may be omitted from the metadata 212.

Figure 3:
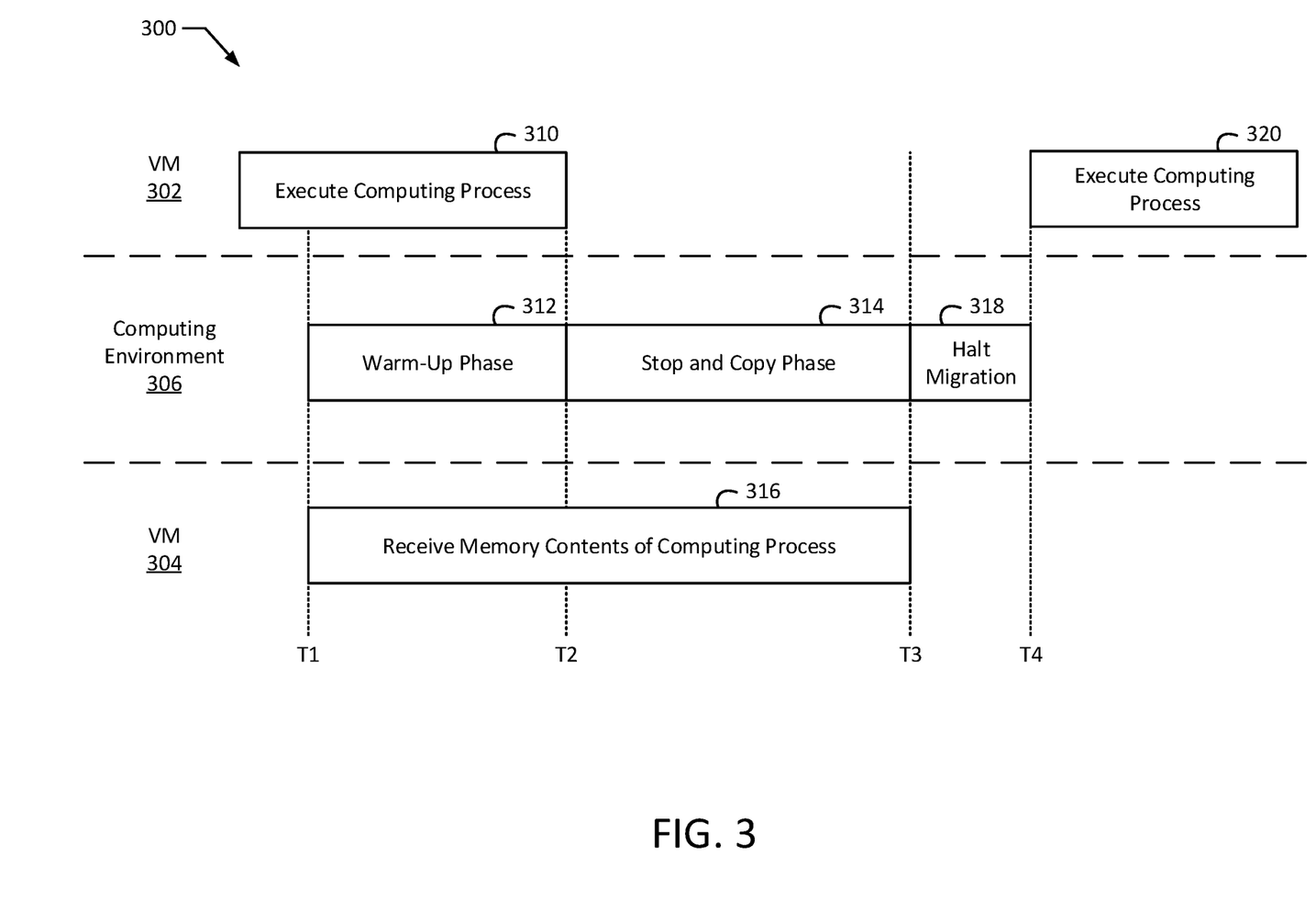
FIG. 3 illustrates a timing diagram of a halted migration process according to an exemplary embodiment of the present disclosure.

FIG. 3 illustrates a timing diagram 300 of a halted migration process according to an exemplary embodiment of the present disclosure. The timing diagram 300 includes two virtual machines 302, 304 and a computing environment 306. In certain implementations, the virtual machines 302, 304 may be exemplary implementations of the virtual machines 106, 110 and the computing environment 306 may be an exemplary implementation of the computing environment 102. The depicted migration process may be attempting to migrate a computing process from a first virtual machine 302 to a second virtual machine 304. In particular, the migration process may be implemented by the computing environment 306, which may be implementing one or both of the first virtual machine 302 and the second virtual machine 304. The horizontal axis of the timing diagram 300 reflects time as the migration process proceeds, although it should be understood that any differences in time are merely illustrative and are not intended to reflect relative durations of any of the blocks 310, 312, 314, 316, 318, 320 in practice.

At the beginning of the timing diagram 300, the virtual machine 302 is executing the computing process (block 310). At time T1, migration of the computing process begins with a first phase of the migration, a warm-up phase (block 312). The warm-up phase may involve copying the contents of the memory from the first VM 302 to the second VM 304. Accordingly, beginning at time T1, the second VM 304 may receive the memory contents for the computing process (block 316). At time T2, the warm-up phase is completed, and the computing environment 306 may begin the second phase of the migration, the stop and copy phase (block 314). During the stop and copy phase, execution of the computing process by the first virtual machine at block 310 ends, while the remaining contents of the memory (and other execution information) are copied to the second virtual machine by the computing environment 306.

During the stop and copy phase, the computing environment 306 may monitor a duration of the stop and copy phase to ensure that the duration does not exceed a migration time limit, which may be determined using techniques similar to those discussed in connection with the migration time limit 124 above. For example, at time T3, the computing environment 306 may determine that the duration of the stop copy phase (e.g., the duration spanning from T2 to T3) exceeded a migration time limit for the computing process. Accordingly, the computing environment 306 may halt migration at time T3 (block 318). Once the migration is halted at time T4, the first virtual machine 302 may resume executing the computing process (block 320).

Figure 4:
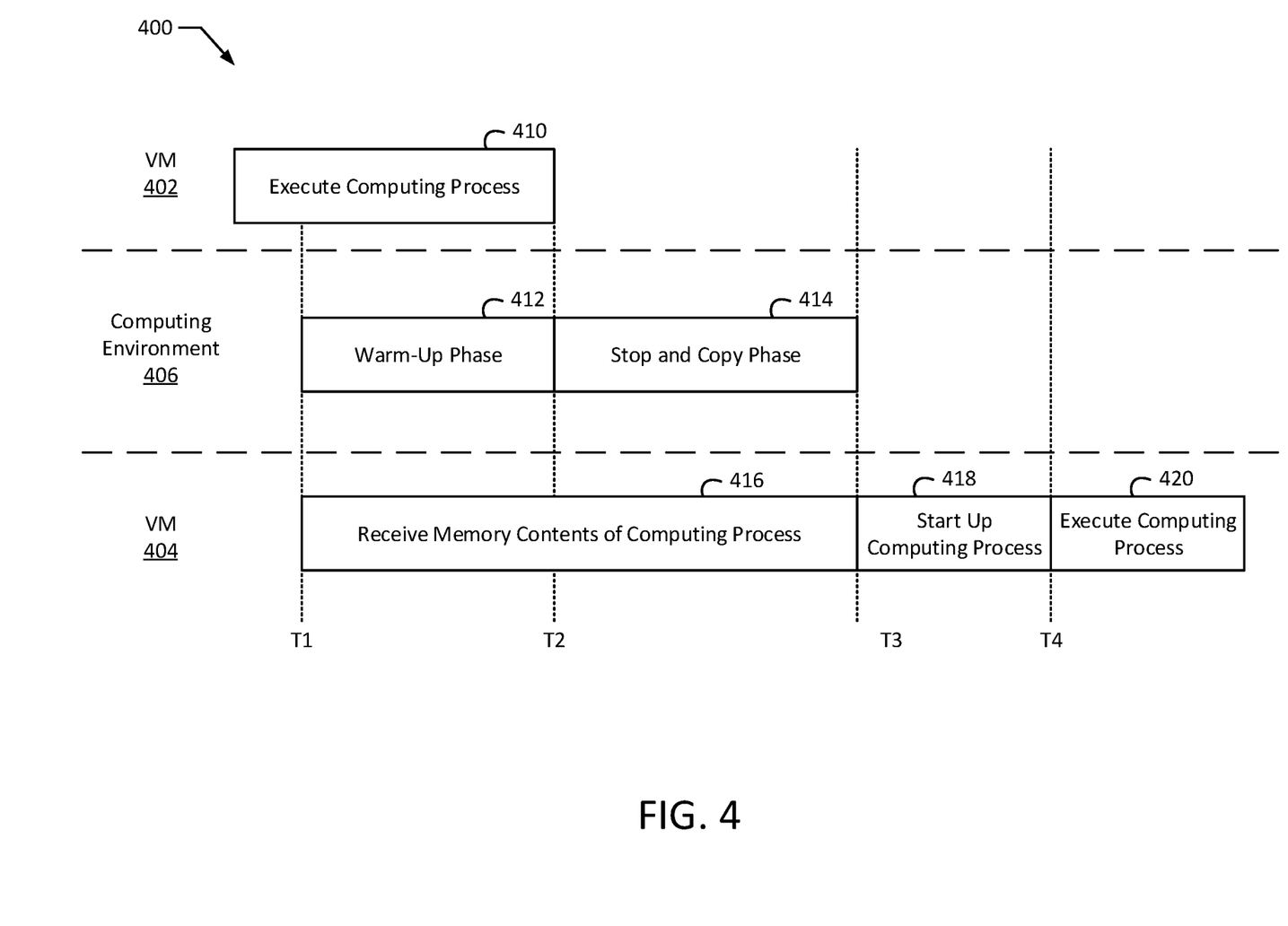
FIG. 4 illustrates a timing diagram of a successful migration process according to an exemplary embodiment of the present disclosure.

FIG. 4 illustrates a timing diagram 400 of a successful migration process according to an exemplary embodiment of the present disclosure. The timing diagram 400 includes two virtual machines 402, 404 and a computing environment 406. In certain implementations, the virtual machines 402, 404 may be exemplary implementations of the virtual machines 106, 110 and the computing environment 406 may be an exemplary implementation of the computing environment 102. The depicted migration process may be attempting to migrate a computing process from a first virtual machine 402 to a second virtual machine 404. In particular, the migration process may be implemented by the computing environment 406, which may be implementing one or both of the first virtual machine 402 and the second virtual machine 404. The horizontal axis of the timing diagram 400 reflects time as the migration process proceeds, although it should be understood that any differences in time are merely illustrative and are not intended to reflect relative durations of any of the blocks 410, 412, 414, 416, 418, 420 in practice.

Blocks 410, 412, 414, 416 may be implemented similar to blocks 310, 312, 314, 316 and the timing diagram 300. In particular, the computing environment 406 may perform similar operations to migrate execution of the computing process from the first virtual machine 402 to the second virtual machine 404 using a warm-up phase and a stop and copy phase. However, at time T3, the computing environment 406 may determine that migration of the computing process is complete prior to exceeding the migration time limit. For example, the computing environment 406 may determine that the memory contents for the computing process successfully copied from the first virtual machine 402 to the second virtual machine 404 before exceeding the migration time limit. Accordingly, the computing environment 406 may transfer execution of the computing process to the second virtual machine 404. The second virtual machine 404 may then start up the computing process at time T3 (block 418). Once the computing process is started up at time T4, the virtual machine 404 may proceed with executing the computing process (block 420).

Figure 5:
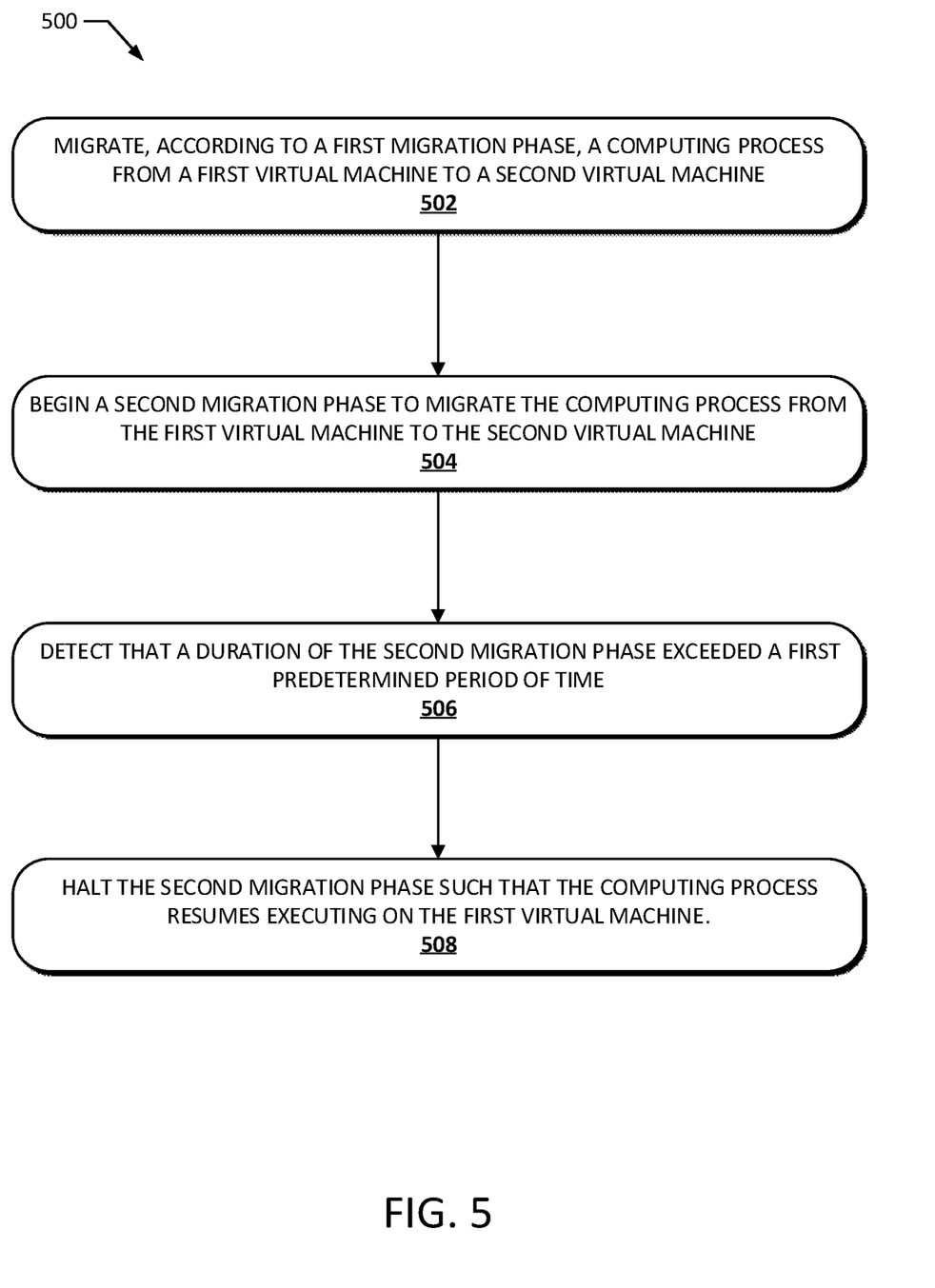
FIG. 5 illustrates a method for live migrating computing processes according to an exemplary embodiment of the present disclosure.

FIG. 5 illustrates a method 500 for live migrating computing processes according to an exemplary embodiment of the present disclosure. The method 500 may be implemented on a computer system, such as the system 100. For example, the method 500 may be implemented by the computing environment 102 and/or the virtual machines 106, 108, 110. The method 500 may also be implemented by a set of instructions stored on a computer readable medium that, when executed by a processor, cause the computer system to perform the method 500. For example, all or part of the method 500 may be implemented by the processor 130 and the memory 132. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with migrating, according to a first migration phase, a computing process from a first virtual machine to a second virtual machine (block 502). For example, a computing environment 102, 306, 406 may migrate a computing process 116 from a first virtual machine 106, 302, 402 to a second virtual machine 110, 304, 404 according to a first migration phase. The computing process 116 may continue executing on the first virtual machine 106, 203, 402 during the first migration phase. For example, the computing process 116 may continue normal operations, such as network communication and/or data processing. As explained above, the computing environment 102, 306, 406 may begin copying all or part of the contents of the memory associated with the computing process 116 from the first virtual machine 106, 302, 402 to the second virtual machine 110, 304, 404. In particular, the contents of the memory may be copied according to a warm-up phase of a live migration performed by the computing environment 102, 306, 406. In certain implementations, the first virtual machine 106, 302, 402 and the second virtual machine 110, 304, 404 may be part of the same computing environment (e.g., the same cloud computing environment, the same cloud computing server). In additional or alternative implementations, the first virtual machine 106, 302, 402 and the second virtual machine 110, 304, 404 may be part of different computing environments (e.g., different cloud computing environments, different cloud computing servers).

A second migration phase may begin to migrate to the computing process from the first virtual machine to the second virtual machine (block 504). For example, the computing environment 102, 306, 406 may begin a second migration phase 128 to migrate the computing process 116 from the first virtual machine 106, 302, 402 to the second virtual machine 110, 304, 404. The second migration phase may require that execution of the computing process 116 be halted in the first virtual machine 106, 302, 402. Furthermore, memory contents associated with the computing process 116 may be further copied during the second migration phase 128. In particular, memory contents that changed over the course of the first migration phase may be updated in the second virtual machine 110, 304, 404 during the second migration phase 128. For example, the second migration phase 128 may be a stop and copy phase of a live migration performed by the computing environment 102, 306, 406.

It may be detected that a duration of the second migration phase exceeded a first predetermined period of time (block 506). For example, the computing environment 102, 306, 406 may determine that the duration of the second migration phase 128 exceeded a first predetermined time, such as a migration time limit 124. As explained further herein, the migration time limit 124 may be determined based on a downtime 114 and/or a predicted worst case start time 126 associated with the computing process 116 being migrated. To detect that the duration of the second migration phase has exceeded the migration time limit 124, the computing environment 102 (e.g., an orchestrator of a Red Hat® Virtualization product) may monitor a duration of the second migration phase on an ongoing basis while performing the second migration phase (e.g., using event-based measurements).

The second migration phase may be halted such that the computing process resumes executing on the first virtual machine (block 508). For example, the second migration phase 128 may be halted such that the computing process 116 continues executing on the first virtual machine 106, 302, 402. For example, the computing environment 102, 306, 406 my stop copying the contents of the memory from the first virtual machine 106, 302, 402 to the second virtual machine 110, 304, 404. The first virtual machine 106, 302, 402 may then resume executing the computing process, as discussed above in connection with the timing diagram 300. For example, the computing environment 102, 306, 406 may transmit a request or command to the first virtual machine 106, 302, 402 to resume execution. After transferring execution back to the first virtual machine 106, 302, 402 the computing environment 102, 306, 406 may increment a tracker of the total number of migration attempts for the computing process 116. For example, the computing environment 102, 306, 406 may increment a migration attempts to 20 within metadata 212 associated with the computing process 116.

After a second predetermined period of time, the computing environment 102, 306, 406 may attempt to migrate the computing process 116 again (e.g., by restarting all or part of the migration process). For example, the second predetermined period of time may be based on a real-time guarantee 214 associated with the computing process. For example, if a 99% uptime is guaranteed in the real-time guarantee 214, the computing process may only be halted for 10 ms every 1 seconds. In such instances, after resuming execution of the computing process 116, the computing environment 102, 306, 406 may wait for 990 ms (1 second-10 ms) before attempting migration again. In certain instances, while the first virtual machine 106, 302 continues executing the computing process 116 after a halted migration, the computing environment 102, 306 may repeat the first migration phase (e.g., the warm-up phase) to maintain an updated copy of the memory contents within the second virtual machine 110, 304. In such instances, once the second predetermined period of time has passed, the migration of the computing process 116 may proceed directly to the second migration phase 128 (e.g., the stop and copy phase). In certain instances, after a total number of migration attempts 220 for the computing process 116 exceeds a predetermined threshold (e.g., 10 attempted migrations, 100 attempted migrations, 1000 attempted migrations), the computing environment 102, 306, 406 may take one or more actions. For example, the computing environment 102, 306, 406 may generate and present an error message (e.g., to a log file, to a user requesting migration). As another example, the computing environment 102, 306, 406 may instantiate an additional virtual machine within the computing environment 102, 306, 406 (e.g., to receive the computing process 116). As a further example, the computing environment 102, 306, 406 may force migration of the computing process 116 by relaxing or otherwise ignoring the downtime 114, 216 constraints (e.g., by increasing the downtime 114, 216).

In this way, the method 500 may enable live migration using a two-phase live migration procedure while also guaranteeing a maximum total downtime for the computing process being migrated. In particular, by adjusting the migration time limit to account for the predicted worst case start time, the method 500 may ensure that, even when a second migration phase may be completed within a downtime associated with a computing process being migrated, the computing process will also resume execution on the second virtual machine before the downtime is exceeded. Accordingly, the method 500 can better ensure guaranteed downtimes, which improves overall uptime for the computing process that is being migrated and improved reliability for computing processes executed within the computing environment. Furthermore, by focusing on a particular migration phase (e.g., a stop and copy migration phase), the method 500 limits the migration phase that actually affects the overall downtime of the computing process being migrated. This allows more accurate tracking and limiting of migrations only in cases where a guaranteed downtime is at risk of being exceeded.

Figure 6:
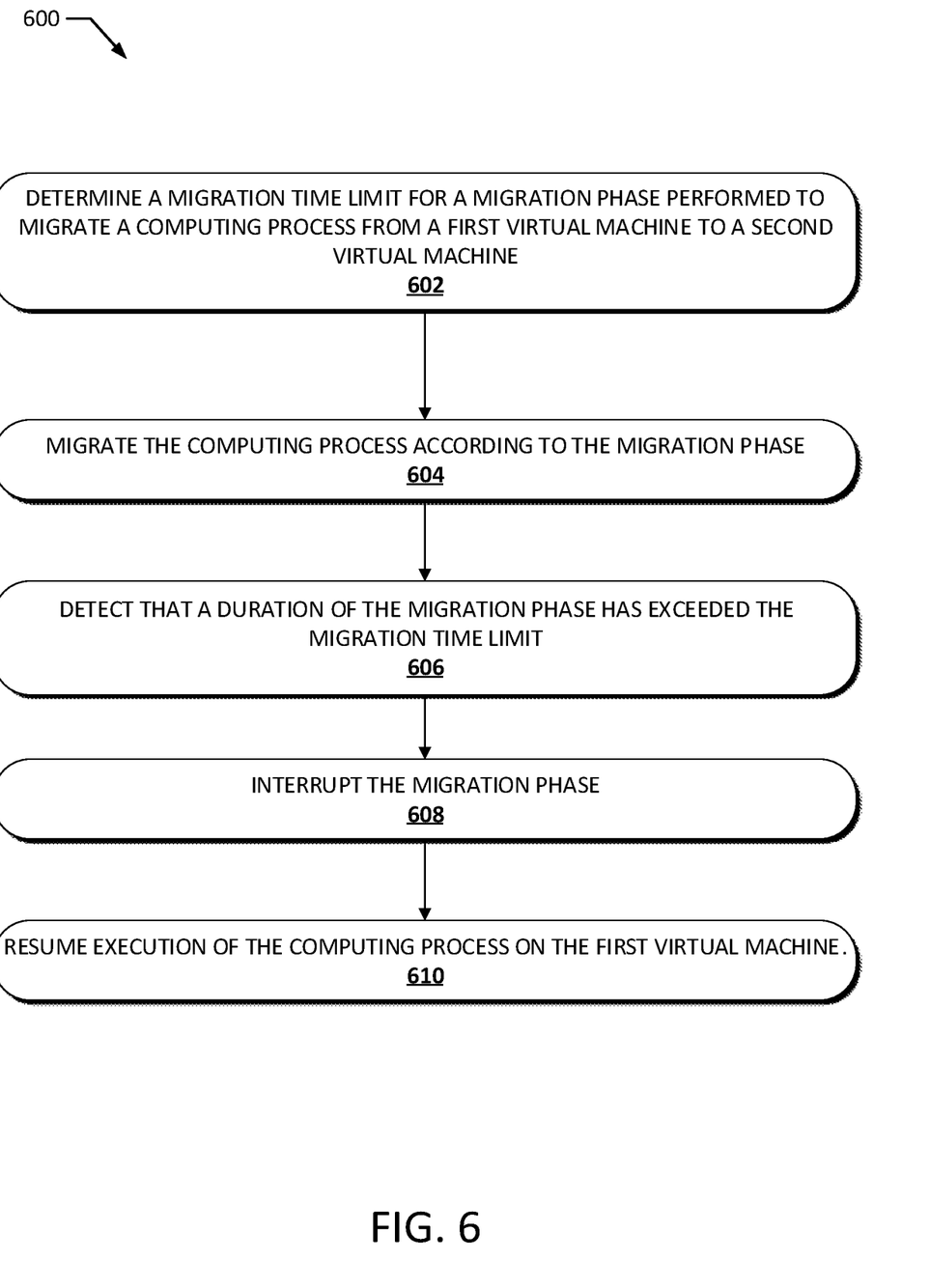
FIG. 6 illustrates a method for live migrating computing processes according to an exemplary embodiment of the present disclosure.

FIG. 6 illustrates a method 600 for live migrating computing processes according to an exemplary embodiment of the present disclosure. The method 600 may be implemented on a computer system, such as the system 100. For example, the method 600 may be implemented by the computing environment 102 and/or the virtual machines 106, 108, 110. The method 600 may also be implemented by a set of instructions stored on a computer readable medium that, when executed by a processor, cause the computer system to perform the method 500. For example, all or part of the method 600 may be implemented by the processor 130 and the memory 132. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with determining a migration limit for a migration phase performed to migrate the computing process from a first virtual machine to a second virtual machine (black 602). For example, a computing environment 102, 306, 406 may determine a migration time limit 124 for a migration phase 128 performed to migrate a computing process 116 from a first virtual machine 106, 302, 402 to a second virtual machine 110, 304, 404. In particular, the migration time limit 124 may be determined based on a predicted worst case start time 126 and a downtime 114. For example, the migration time limit 124 may be calculated by subtracting a predicted worst case start time 126 from a downtime 114. As a specific example, the downtime may be 50 ms in the predicted worst case start time 126 may be 10 ms, and the migration time limit 124 may be calculated as 50 ms-10 ms=40 ms.

The computing process may be migrated according to the migration phase (block 604). For example, the computing environment 102, 306, 406 may migrate the computing process 116 according to the migration phase 128. Migrating the computing process 116 according to the migration phase 128 may include halting execution of the computing process 116. For example, in certain implementations, the migration phase 128 may be a second phase of a live migration process, such as a stop and copy phase of the live migration process. Migrating the computing process 116 may include copying contents from the first virtual machine 106, 302, 402 to the second virtual machine 110, 304, 404. For example, the migration phase 128 may include copying updated memory contents (e.g., "dirty" memory pages) that changed over the course of a first migration phase, such as a warm-up phase.

It may be detected that iteration of the migration phase has exceeded the migration time limit (block 606). For example, the computing environment 102, 306, 406 may detect the duration of the migration phase 128 has exceeded the migration time limit 124. The computing environment 102, 306, 406 may monitor the duration of the migration phase 128 on an ongoing basis (e.g., based on a start time T2 of the migration phase 128).

The migration phase may be interrupted (block 608). For example, the computing environment 102, 306, 406 may interrupt the migration phase 128. In particular, the migration phase 128 may be interrupted upon detecting that the duration of the migration phase 128 exceeds the migration time limit 124. Interrupting the migration phase 128 may include stopping the copying of memory contents from the first virtual machine 106, 302, 402 to the second virtual machine 110, 304, 404. As explained above, after interrupting the migration phase 128, a tracking mechanism (e.g., migration attempts 220 metadata) may be incremented to update the total number of migration attempts. If a predetermined number of attempts are exceeded, one or more further actions may be taken, as explained above.

Execution of the computing process may resume on the first virtual machine (block 610). For example, the computing environment 102, 306, 406 may resume execution of the computing process 116 on the first virtual machine 106, 302, 402. In particular, the first virtual machine 106, 302, 402 may resume executing the computing process 116 from the point at which execution of the computing process 116 stopped at the beginning of the migration phase 128. As explained above in connection with the method 500, an initial migration phase (e.g., a warm-up phase) may be performed after execution resumes on the first virtual machine 106, 302, 402. In particular, after a second predetermined period of time, the computing environment 102, 306, 408 may attempt to migrate the computing process again.

Similar to the method 500, the method 600 may enable live migration using a two-phase live migration procedure also guaranteeing a total downtime requirement for the computing process being migrated. As explained above, adjusting the migration time limit to account for predicted worst case start times reduces the chances that a computing process that is slow to start because he migration to exceed a specified downtime. Furthermore, focusing on the particular migration phase (e.g., the stop and copy migration phase) in generating and applying the migration time limit focuses tracking and limiting of the migration process to the migration phase that actually affects the overall downtime of the computing process, which allows for more accurate tracking and more targeted halting of migration procedures.

Figure 7:
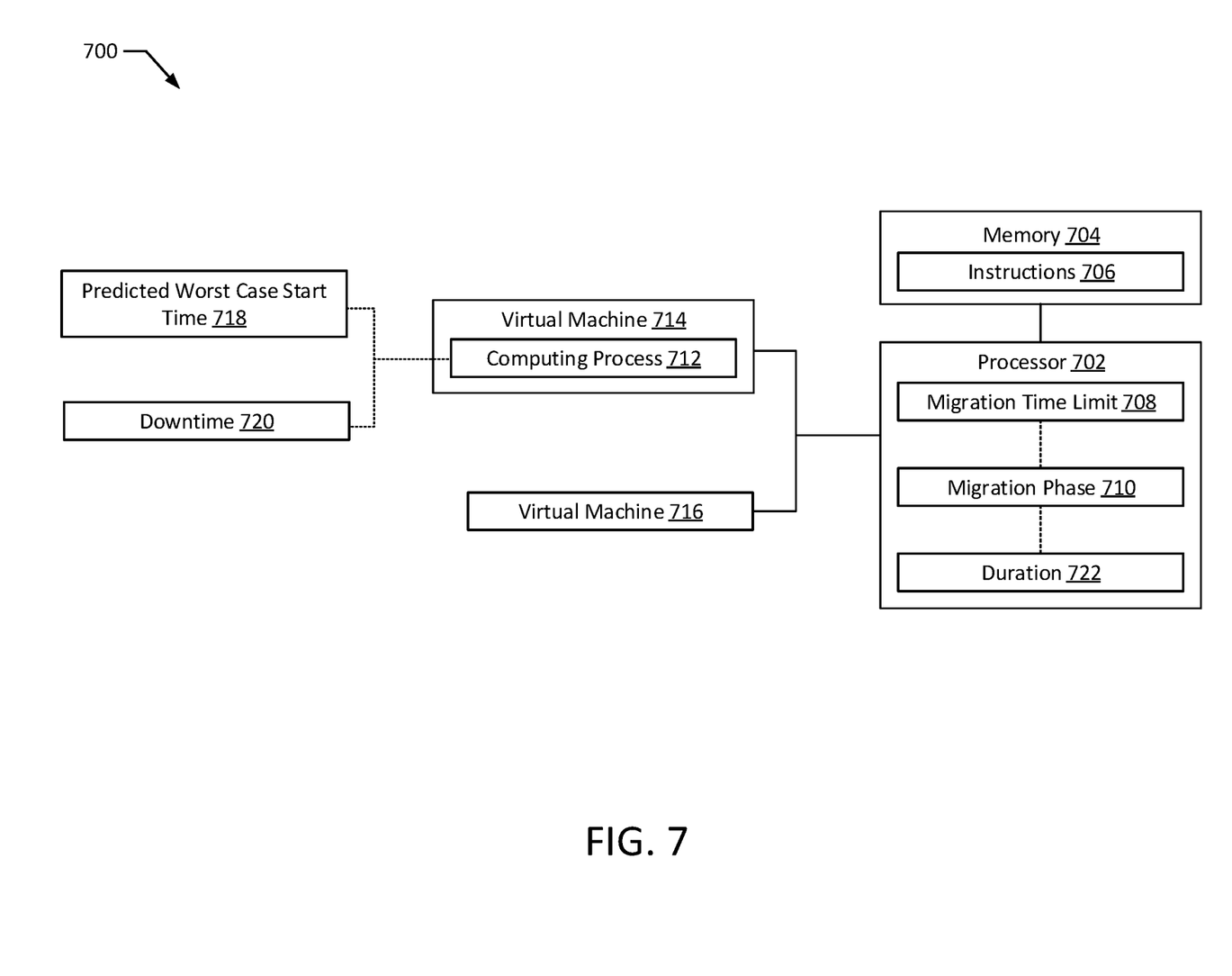
FIG. 7 illustrates a system according to an exemplary embodiment of the present disclosure.

FIG. 7 illustrates a system 700 according to an exemplary embodiment of the present disclosure. The system 700 includes a processor 702 and a memory 704 storing instructions 706. When executed by the processor 702, the instruction 706 may cause the processor 702 to determine a migration time limit 708 for a migration phase 710 performed to migrate a computing process 712 from a first virtual machine 714 to a second virtual machine 716. The migration time limit 708 may be determined by subtracting a predicted worst case start time 718 for the computing process 712 from a downtime 720 associated with the computing process 712. The instructions 706 may further cause the processor 702 to migrate the computing process according to the migration phase 710. Execution of the computing process 712 may halt on the first virtual machine 714 during the migration phase 710. The processor 702 may detect that a duration 722 of the migration phase 710 has exceeded the migration time limit 708 and interrupt the migration phase 710. Execution of the computing process 712 may be resumed on the first virtual machine 714.

Aspects of the subject matter described herein may be useful alone or in combination with one or more aspects described herein. In a first aspect, a method is provided that includes migrating, according to a first migration phase, a computing process from a first virtual machine to a second virtual machine. The computing process may continue executing on the first virtual machine during the first migration phase. The method may further include beginning, upon completing the first migration phase, a second migration phase to migrate the computing process from the first virtual machine to the second virtual machine. Execution of the computing process may halt on the first virtual machine during the second migration phase. The method may also include detecting that a duration of the second migration phase exceeded a first predetermined period of time. The first predetermined period of time may be determined at least in part based on (i) a downtime for resuming execution of the computing process and (ii) a predicted worst case start time for the computing process on the second virtual machine. The method may further include halting the second migration phase such that the computing process resumes executing on the first virtual machine.

In a second aspect according to any of the previous aspects (e.g., the first aspect), the first predetermined period of time is determined by subtracting the predicted worst case start time from the downtime.

In a third aspect according to any of the previous aspects (e.g., the first and second aspects, the downtime for resuming execution of the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

In a fourth aspect according to any of the previous aspects (e.g., the first through third aspects), the downtime for resuming execution of the computing process is stored as metadata associated with the computing process.

In a fifth aspect according to any of the previous aspects (e.g., the first through fourth aspects), the predicted worst case start time is determined as the longest start time for a predetermined number of previous start times of the computing process.

In a sixth aspect according to any of the previous aspects (e.g., the fifth aspect), the previous start times are recorded using event-based measurements for a predetermined number of previous migrations of the computing process.

In a seventh aspect according to any of the previous aspects (e.g., the first through sixth aspects), the predicted worst case start time is stored as metadata associated with the computing process.

In an eighth aspect according to any of the previous aspects (e.g., the first through seventh aspects, the first migration phase is a warm-up phase and the second migration phase is a stop and copy phase.

In a ninth aspect according to any of the previous aspects (e.g., the first through eighth aspects), the first migration phase is repeated while the computing process continues executing on the first virtual machine.

In a tenth aspect according to any of the previous aspects (e.g., the first through ninth aspects), the method further includes restarting the migration of the computing process after a second predetermined period of time.

In an eleventh aspect according to any of the previous aspects (e.g., the tenth aspect), restarting the migration begins at the second migration phase.

In a twelfth aspect according to any of the previous aspects (e.g., the tenth and eleventh aspects), the second predetermined period of time is determined based on a real-time guarantee associated with the computing process.

In a thirteenth aspect according to any of the previous aspects (e.g., the tenth through twelfth aspects), the method further includes, after a predetermined number of attempted migrations, at least one of (i) presenting an error message, (ii) instantiating a third virtual machine for migration of the computing process, and (iii) migrating the computing process regardless of the duration of the second migration phase.

In a fourteenth aspect, a system is provided that includes a processor and a memory. The memory stores instructions which, when executed by the processor, cause the processor to migrate, according to a first migration phase, a computing process from a first virtual machine to a second virtual machine. The computing process may continue executing on the first virtual machine during the first migration phase. The instructions may further cause the processor to begin, upon completing the first migration phase, a second migration phase to migrate the computing process from the first virtual machine to the second virtual machine. Execution of the computing process may halt on the first virtual machine during the second migration phase. The instructions may also cause the processor to detect that a duration of the second migration phase exceeded a first predetermined period of time. The first predetermined period of time may be determined at least in part based on (i) a downtime for resuming execution of the computing process and (ii) a predicted worst case start time for the computing process on the second virtual machine. The instructions may further cause the process to halt the second migration phase such that the computing process resumes executing on the first virtual machine.

In a fifteenth aspect according to any of the previous aspects (e.g., the fourteenth aspect), the first predetermined period of time is determined by subtracting the predicted worst case start time from the downtime.

In a sixteenth aspect according to any of the previous aspects (e.g., the fourteenth and fifteenth aspects), the downtime for resuming execution of the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

In a seventeenth aspect according to any of the previous aspects (e.g., the fourteenth through sixteenth aspects), the downtime for resuming execution of the computing process is stored as metadata associated with the computing process.

In an eighteenth aspect according to any of the previous aspects (e.g., the fourteenth through seventeenth aspects), the predicted worst case start time is determined as the maximum start time for a predetermined number of previous start times of the computing process.

In a nineteenth aspect according to any of the previous aspects (e.g., the eighteenth aspect), the previous start times are recorded using event-based measurements for a predetermined number of previous migrations of the computing process.

In a twentieth aspect according to any of the previous aspects (e.g., the fourteenth through nineteenth aspects), the predicted worst case start time is stored as metadata associated with the computing process.

In a twenty-first aspect according to any of the previous aspects (e.g., the fourteenth through twentieth aspects), the first migration phase is a warm-up phase and the second migration phase is a stop and copy phase.

In a twenty-second aspect according to any of the previous aspects (e.g., the fourteenth through twenty-first aspects), the first migration phase is repeated while the computing process continues executing on the first virtual machine.

In a twenty-third aspect according to any of the previous aspects (e.g., the fourteenth through twenty-second aspects), the instructions further cause the processor to restart the migration of the computing process after a second predetermined period of time.

In a twenty-fourth aspect according to any of the previous aspects (e.g., the twenty-third aspects), restarting the migration begins at the second migration phase.

In a twenty-fifth aspect according to any of the previous aspects (e.g., the twenty-third to twenty-fourth aspects), the second predetermined period of time is determined based on a real-time guarantee associated with the computing process.

In a twenty-sixth aspect according to any of the previous aspects (e.g., the twenty-third through twenty-fifth aspects), the instructions further cause the processor to, after a predetermined number of attempted migrations, at least one of (i) present an error message, (ii) instantiate a third virtual machine for migration of the computing process, and (iii) migrating the computing process regardless of the duration of the second migration phase.

In a twenty-seventh aspect, a non-transitory, computer-readable medium storing instructions which, when executed by a processor, cause the processor to migrate, according to a first migration phase, a computing process from a first virtual machine to a second virtual machine. The computing process may continue executing on the first virtual machine during the first migration phase. The instructions may further cause the processor to begin, upon completing the first migration phase, a second migration phase to migrate the computing process from the first virtual machine to the second virtual machine. Execution of the computing process may halt on the first virtual machine during the second migration phase. The instructions may also cause the processor to detect that a duration of the second migration phase exceeded a first predetermined period of time. The first predetermined period of time may be determined at least in part based on (i) a downtime for resuming execution of the computing process and (ii) a predicted worst case start time for the computing process on the second virtual machine. The instructions may further cause the process to halt the second migration phase such that the computing process resumes executing on the first virtual machine.

In a twenty-eighth aspect, a system is provided that includes a first migration means configured to migrate, according to a first migration phase, a computing process from a first virtual machine to a second virtual machine. The computing process may continue executing on the first virtual machine during the first migration phase. The system may further include a second migration means configured to begin, upon completing the first migration phase, a second migration phase to migrate the computing process from the first virtual machine to the second virtual machine. Execution of the computing process may halt on the first virtual machine during the second migration phase. The system may also include a migration monitoring means configured to detect that a duration of the second migration phase exceeded a first predetermined period of time. The first predetermined period of time may be determined at least in part based on (i) a downtime for resuming execution of the computing process and (ii) a predicted worst case start time for the computing process on the second virtual machine. The system may further include a migration halting means configured to halt the second migration phase such that the computing process resumes executing on the first virtual machine.

In a twenty-ninth aspect, a method is provided that includes determining a migration time limit for a migration phase performed to migrate a computing process from a first virtual machine to a second virtual machine by subtracting a predicted worst case start time for the computing process from a downtime associated with the computing process. The method may also include migrating the computing process according to the migration phase. Execution of the computing process may halt on the first virtual machine during the migration phase. The method may further include detecting that a duration of the migration phase has exceeded the migration time limit, interrupting the migration phase, and resuming execution of the computing process on the first virtual machine.

In a thirtieth aspect according to any of the previous aspects (e.g., the twenty-ninth aspect), the downtime associated with the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

In a thirty-first aspect according to any of the previous aspects (e.g., the twenty-ninth and thirtieth aspects), the downtime associated with the computing process is stored as metadata associated with the computing process.

In a thirty-second aspect according to any of the previous aspects (e.g., the twenty-ninth through thirty-first aspects), the predicted worst case start time is determined as the maximum start time for a predetermined number of previous start times of the computing process.

In a thirty-third aspect according to any of the previous aspects (e.g., the thirty-second aspect), the previous start times are recorded using event-based measurements for a predetermined number of previous migrations of the computing process.

In a thirty-fourth aspect according to any of the previous aspects (e.g., the twenty-ninth through thirty-third aspects), the predicted worst case start time is stored as metadata associated with the computing process.

In a thirty-fifth aspect according to any of the previous aspects (e.g., the twenty-ninth through thirty-fourth aspects), the migration phase is a stop and copy phase.

In a thirty-sixth aspect according to any of the previous aspects (e.g., the thirty-fifth aspect), a warm-up migration phase is repeated while the computing process continues executing on the first virtual machine.

In a thirty-seventh aspect according to any of the previous aspects (e.g., the twenty-ninth through thirty-sixth aspects, the method further includes restarting the migration of the computing process after a predetermined period of time.

In a thirty-eighth aspect according to any of the previous aspects (e.g., the thirty-seventh aspect), restarting the migration begins at the migration phase.

In a thirty-ninth aspect according to any of the previous aspects (e.g., the thirty-seventh and thirty-eighth aspects), the predetermined period of time is determined based on a real-time guarantee associated with the computing process.

In a fortieth aspect according to any of the previous aspects (e.g., the thirty-seventh through thirty-ninth aspects), the method further includes, after a predetermined number of attempted migrations, at least one of (i) presenting an error message, (ii) instantiating a third virtual machine for migration of the computing process, and (iii) migrating the computing process regardless of the duration of the migration phase.

In a forty-first aspect, a system is provided that includes a processor and a memory. The memory stores instructions which, when executed by the processor, cause the processor to determine a migration time limit for a migration phase performed to migrate a computing process from a first virtual machine to a second virtual machine by subtracting a predicted worst case start time for the computing process from a downtime associated with the computing process. The instructions may further cause the processor to migrate the computing process according to the migration phase. Execution of the computing process may halt on the first virtual machine during the migration phase. The instructions may also cause the processor to detect that a duration of the migration phase has exceeded the migration time limit, interrupt the migration phase, and resume execution of the computing process on the first virtual machine.

In a forty-second aspect according to any of the previous aspects (e.g., the forty-first aspect), the downtime associated with the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

In a forty-third aspect according to any of the previous aspects (e.g., the forty-first and forty-second aspect), the downtime associated with the computing process is stored as metadata associated with the computing process.

In a forty-fourth aspect according to any of the previous aspects (e.g., the forty-first through forty-third aspects), the predicted worst case start time is determined as the maximum start time for a predetermined number of previous start times of the computing process.

In a forty-fifth aspect according to any of the previous aspects (e.g., the forty-fourth aspect), the previous start times are recorded using event-based measurements for a predetermined number of previous migrations of the computing process.

In a forty-sixth aspect according to any of the previous aspects (e.g., the forty-first through forty-fifth aspects), the predicted worst case start time is stored as metadata associated with the computing process.

In a forty-seventh aspect according to any of the previous aspects (e.g., the forty-first through forty-sixth aspects), the migration phase is a stop and copy phase.

In a forty-eighth aspect according to any of the previous aspects (e.g., the forty-seventh aspects), a warm-up migration phase is repeated while the computing process continues executing on the first virtual machine.

In a forty-ninth aspect according to any of the previous aspects (e.g., the forty-first through forty-eighth aspects), the instructions further cause the processor to restart the migration of the computing process after a predetermined period of time.

In a fiftieth aspect according to any of the previous aspects (e.g., the forty-ninth aspect), restarting the migration begins at the migration phase.

In a fifty-first aspect according to any of the previous aspects (e.g., the forty-ninth and fiftieth aspects), the predetermined period of time is determined based on a real-time guarantee associated with the computing process.

In a fifty-second aspect according to any of the previous aspects (e.g., the forty-ninth through fifty-first aspects), the instructions further cause the processor to, after a predetermined number of attempted migrations, at least one of (i) present an error message, (ii) instantiate a third virtual machine for migration of the computing process, and (iii) migrating the computing process regardless of the duration of the migration phase.

In a fifty-third aspect, a non-transitory, computer-readable medium storing instructions which, when executed by a processor, cause the processor to determine a migration time limit for a migration phase performed to migrate a computing process from a first virtual machine to a second virtual machine by subtracting a predicted worst case start time for the computing process from a downtime associated with the computing process. The instructions may further cause the processor to migrate the computing process according to the migration phase. Execution of the computing process may halt on the first virtual machine during the migration phase. The instructions may also cause the processor to detect that a duration of the migration phase has exceeded the migration time limit, interrupt the migration phase, and resume execution of the computing process on the first virtual machine.

In a forty-fourth aspect, a system is provided that includes migration means configured to determine a migration time limit for a migration phase performed to migrate a computing process from a first virtual machine to a second virtual machine by subtracting a predicted worst case start time for the computing process from a downtime associated with the computing process. The system may further include migration means configured to migrate the computing process according to the migration phase. Execution of the computing process may halt on the first virtual machine during the migration phase. The system may also include detecting means configured to detect that a duration of the migration phase has exceeded the migration time limit. The system may still further include interrupting means configured to interrupt the migration phase and executing means resume execution of the computing process on the first virtual machine.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   migrating, according to a first migration phase, a computing process from a first virtual machine to a second virtual machine, wherein the computing process continues executing on the first virtual machine during the first migration phase;
   beginning, upon completing the first migration phase, a second migration phase to migrate the computing process from the first virtual machine to the second virtual machine, wherein execution of the computing process halts on the first virtual machine during the second migration phase;
   detecting that a duration of the second migration phase exceeded a first predetermined period of time, the first predetermined period of time determined at least in part based on (i) a downtime for resuming execution of the computing process and (ii) a predicted worst case start time for the computing process on the second virtual machine; and
   halting the second migration phase such that the computing process resumes executing on the first virtual machine.

2. The method of claim 1, wherein the first predetermined period of time is determined by subtracting the predicted worst case start time from the downtime.

3. The method of claim 1, wherein the downtime for resuming execution of the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

4. The method of claim 1, wherein the downtime for resuming execution of the computing process is stored as metadata associated with the computing process.

5. The method of claim 1, wherein the predicted worst case start time is determined as the longest start time for a predetermined number of previous start times of the computing process.

6. The method of claim 5, wherein the previous start times are recorded using event-based measurements for a predetermined number of previous migrations of the computing process.

7. The method of claim 1, wherein the predicted worst case start time is stored as metadata associated with the computing process.

8. The method of claim 1, wherein the first migration phase is a warm-up phase and the second migration phase is a stop and copy phase.

9. The method of claim 1, wherein the first migration phase is repeated while the computing process continues executing on the first virtual machine.

10. The method of claim 1, further comprising restarting the migration of the computing process after a second predetermined period of time.

11. The method of claim 10, wherein restarting the migration begins at the second migration phase.

12. The method of claim 10, wherein the second predetermined period of time is determined based on a real-time guarantee associated with the computing process.

13. The method of claim 10, wherein the method further comprises, after a predetermined number of attempted migrations, at least one of (i) presenting an error message, (ii) instantiating a third virtual machine for migration of the computing process, and (iii) migrating the computing process regardless of the duration of the second migration phase.

14. A system comprising:
a processor; and
a memory storing instructions which, when executed by the processor, cause the processor to:
determine a migration time limit for a migration phase performed to migrate a computing process from a first virtual machine to a second virtual machine by subtracting a predicted worst case start time for the computing process from a downtime associated with the computing process;
migrate the computing process according to the migration phase, wherein
execution of the computing process halts on the first virtual machine during the migration phase;
detect that a duration of the migration phase has exceeded the migration time limit;
interrupt the migration phase; and
resume execution of the computing process on the first virtual machine.

15. The system of claim 14, wherein the downtime associated with the computing process is determined based on at least one of (i) a first downtime specified by a container in which the computing process executes, (ii) a second downtime associated with a user requesting migration of the computing process, (iii) a third downtime specified in a request to migrate the computing process, (iv) a fourth downtime determined based on a time of day, and/or (v) a fifth downtime based on an amount of computing resources available for the second virtual machine.

16. The system of claim 14, wherein the predicted worst case start time is stored as metadata associated with the computing process.

17. The system of claim 14, wherein the migration phase is a stop and copy phase.

18. The system of claim 17, wherein a warm-up migration phase is repeated while the computing process continues executing on the first virtual machine.

19. The system of claim 14, wherein the instructions further cause the processor to restart the migration of the computing process after a predetermined period of time.

20. The system of claim 19, wherein restarting the migration begins at the migration phase.

* * * * *